US012786583B2

(12) United States Patent
Morishita et al.

(10) Patent No.: US 12,786,583 B2
(45) Date of Patent: Nov. 3, 2026

(54) PHOTOELECTRIC CONVERSION DEVICE AND EQUIPMENT USING PHOTOELECTRIC CONVERSION DEVICE

(71) Applicant: CANON KABUSHIKI KAISHA, Tokyo (JP)

(72) Inventors: Aoi Morishita, Kanagawa (JP); Satoshi Kumaki, Saitama (JP); Yoshihito Nagawa, Kanagawa (JP); Takanori Yamashita, Tokyo (JP); Hideki Ikedo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/184,061

(22) Filed: Apr. 21, 2025

(65) Prior Publication Data

US 2025/0338035 A1 Oct. 30, 2025

(30) Foreign Application Priority Data

Apr. 30, 2024 (JP) ................................ 2024-074040

(51) Int. Cl.
*H04N 25/65* (2023.01)
*H04N 25/78* (2023.01)

(52) U.S. Cl.
CPC ............. *H04N 25/65* (2023.01); *H04N 25/78* (2023.01)

(58) Field of Classification Search
CPC ...... H04N 25/65; H04N 25/78; H04N 25/767; H03M 1/0609; H03K 5/2481; H03F 3/04
See application file for complete search history.

(56) References Cited

U.S. PATENT DOCUMENTS 9,300,889 B2 * 3/2016 Hashimoto ............... H03F 3/04
9,680,494 B2 * 6/2017 Hashimoto ......... H03M 1/0609
9,749,570 B2 8/2017 Yamashita
10,136,086 B2 11/2018 Ikedo
(Continued)

FOREIGN PATENT DOCUMENTS

JP 2007-281987 A 10/2007
JP 2010-252140 A 11/2010
(Continued)

OTHER PUBLICATIONS

U.S. Appl. No. 19/060,075, filed Feb. 21, 2025 (First Named Inventor: Satoshi Kumaki).
(Continued)

*Primary Examiner* — Hung H Lam
(74) *Attorney, Agent, or Firm* — Venable LLP

(57) ABSTRACT

The photoelectric conversion device comprises a first pixel, a first analog-to-digital converter, a reference signal generation circuit configured to generate a first reference signal, and a second reference signal. The first analog-to-digital converter includes a first comparator circuit configured to receive two signals including the signal from the first pixel and the first reference signal, and a second comparator circuit configured to receive two signals including the signal from the first pixel and the second reference signal. Prior to the analog-to-digital conversion, the control circuit applies a first offset voltage between the signals input to the first comparator circuit, applies a second offset voltage between the signals input to the second comparator circuit.

14 Claims, 9 Drawing Sheets

(56) References Cited

U.S. PATENT DOCUMENTS

| | | | | |
|---|---|---|---|---|
| 10,277,854 | B2 | 4/2019 | Ikedo | |
| 10,536,675 | B2 | 1/2020 | Kumaki | |
| 10,638,066 | B2 | 4/2020 | Kobayashi et al. | |
| 10,785,439 | B2 | 9/2020 | Ikedo | |
| 11,082,642 | B2 | 8/2021 | Fukuhara | |
| 11,089,256 | B2 | 8/2021 | Ikedo | |
| 11,284,032 | B2 | 3/2022 | Shinohara | |
| 11,394,908 | B2 | 7/2022 | Akiyama | |
| 11,418,745 | B2 | 8/2022 | Yamashita | |
| 11,509,852 | B2 | 11/2022 | Suzuki | |
| 11,523,075 | B2 | 12/2022 | Suzuki | |
| 12,316,989 | B2 | 5/2025 | Takada et al. | |
| 12,335,651 | B2 | 6/2025 | Ichino | |
| 12,363,454 | B2 | 7/2025 | Ohshitanai | |
| 2008/0136948 | A1 | 6/2008 | Muramatsu | |
| 2008/0169955 | A1* | 7/2008 | Inada | H03M 1/1023 341/118 |
| 2010/0052965 | A1* | 3/2010 | Onizuka | H04N 25/78 341/144 |
| 2010/0265374 | A1 | 10/2010 | Nishi | |
| 2014/0008515 | A1* | 1/2014 | Wang | H04N 25/78 341/161 |
| 2014/0098271 | A1 | 4/2014 | Hagihara | |
| 2014/0253205 | A1* | 9/2014 | Wang | H03K 5/2481 327/307 |
| 2021/0377480 | A1* | 12/2021 | Yamashita | H04N 25/767 |
| 2023/0292024 | A1 | 9/2023 | Ichino | |

FOREIGN PATENT DOCUMENTS

| | | | |
|---|---|---|---|
| JP | 2011-120093 | A | 6/2011 |
| JP | 2014-075691 | A | 4/2014 |
| JP | 2014-135645 | A | 7/2014 |
| JP | 2019-135815 | A | 8/2019 |
| JP | 2022-170557 | A | 11/2022 |

OTHER PUBLICATIONS

U.S. Appl. No. 19/175,170, filed Apr. 10, 2025 (First Named Inventor: Takanori Yamashita).
U.S. Appl. No. 19/176,302, filed Apr. 11, 2025 (First Named Inventor: Yu Arishima).
U.S. Appl. No. 19/198,447, filed May 5, 2025 (First Named Inventor: Takashi Fukuhara).
U.S. Appl. No. 19/269,963, filed Jul. 15, 2025 (First Named Inventor: Shoji Kono).
Office Action dated Jan. 19, 2026, in Japanese Patent Application No. 2024-074040.

* cited by examiner

PHOTOELECTRIC CONVERSION DEVICE AND EQUIPMENT USING PHOTOELECTRIC CONVERSION DEVICE

BACKGROUND OF THE INVENTION

Field of the Invention

The present invention relates to a photoelectric conversion device and equipment using the photoelectric conversion device.

Description of the Related Art

Japanese Patent Laid-Open No. 2019-135815 (to be referred to as PTL 1 hereinafter) describes a photoelectric conversion device in which two variable gain amplifiers and two signal processing circuits on the subsequent stage of the variable gain amplifiers are provided for one vertical output line to simultaneously output pixel signals with different gains. Two comparator circuits are provided for one pixel column. According to PTL 1, this arrangement can widen the dynamic range.

However, in the arrangement described in PTL 1, comparator circuits corresponding to different gains may simultaneously change. This causes power supply variations, and the variations can propagate to another signal line to generate noise in analog-to-digital conversion of a pixel signal.

SUMMARY OF THE INVENTION

The present invention has been made to solve the above-described disadvantages, and can provide a technique advantageous for reducing noise generated in A/D conversion when a pixel signal is amplified with different gains and analog-to-digital (A/D)-converted.

According to one aspect of disclosure, there is provided a photoelectric conversion device. The photoelectric conversion device comprises a first pixel, a first analog-to-digital converter configured to analog-to-digital-convert a signal from the first pixel, a reference signal generation circuit configured to generate a first reference signal for which a voltage monotonously changes with respect to time at a first rate of change, and a second reference signal for which the voltage monotonously changes with respect to time at a second rate of change lower than the first rate of change, and a control circuit. The first analog-to-digital converter includes a first comparator circuit configured to receive two signals including the signal from the first pixel and the first reference signal, and a second comparator circuit configured to receive two signals including the signal from the first pixel and the second reference signal. Prior to the analog-to-digital conversion, the control circuit applies a first offset voltage between the signals input to the first comparator circuit, applies a second offset voltage between the signals input to the second comparator circuit, and sets the first offset voltage and the second offset voltage to make a product of a reciprocal of the first rate of change and the first offset voltage be smaller than a product of a reciprocal of the second rate of change and the second offset voltage.

Further features of the present invention will become apparent from the following description of exemplary embodiments with reference to the attached drawings.

DESCRIPTION OF THE EMBODIMENTS

Figure 1:
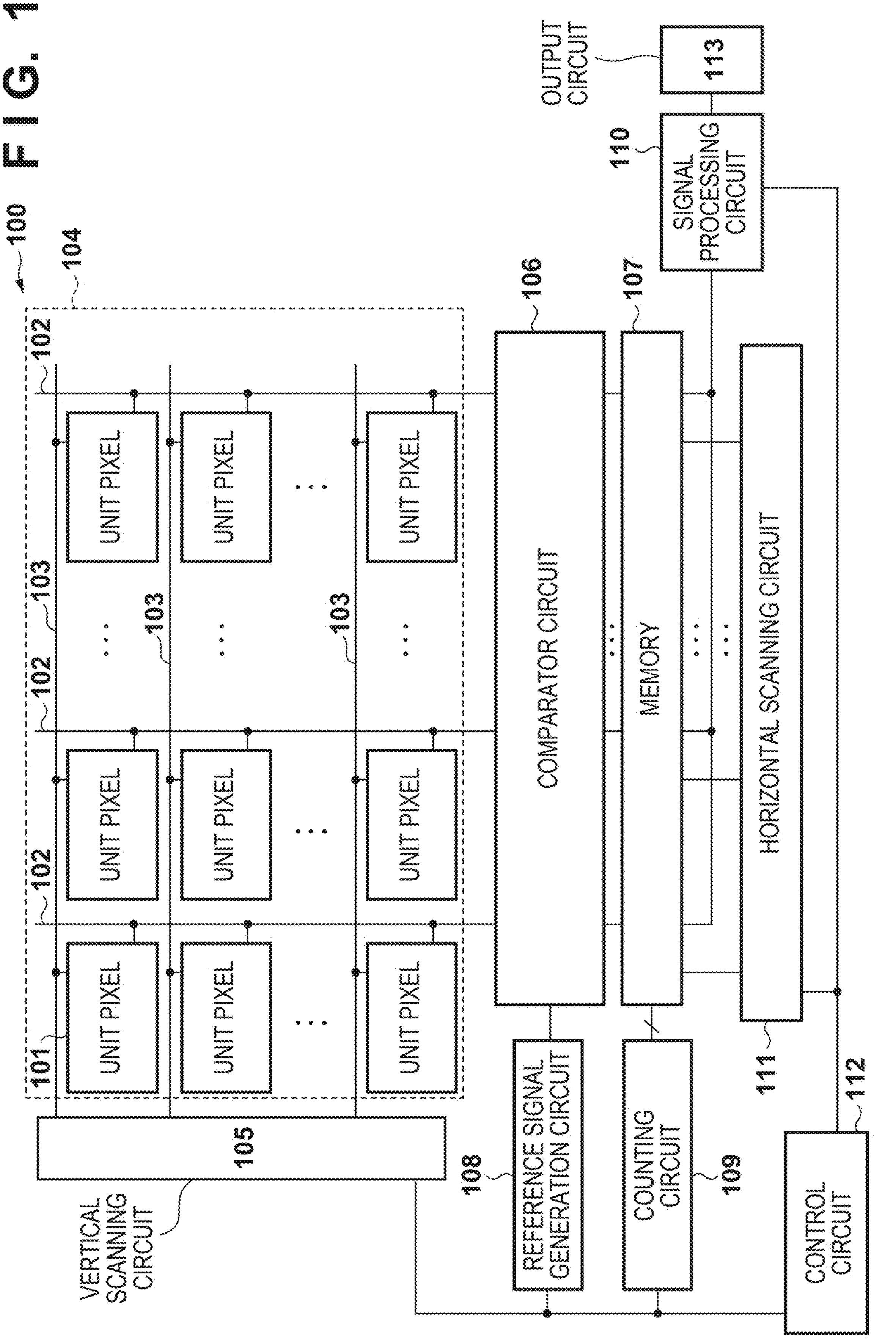
FIG. 1 is a block diagram showing the schematic arrangement of a photoelectric conversion device according to the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In each embodiment to be described below, an image sensing device will be mainly explained as an example of a photoelectric conversion device. Note that each embodiment is not limited to the image sensing device and is applicable to another example of the photoelectric conversion device. Examples of the photoelectric conversion device are a distance measurement device (device for distance measurement or the like using focus detection or Time Of Flight (TOF)), and a photometry device (device for measurement of the quantity of incident light or the like).

In the following embodiments, connections between circuit elements will be sometimes described. In this case, even when another element is interposed between elements of interest, the elements of interest are considered to be connected, unless otherwise specified. For example, assume that an element A is connected to one node of a capacitive element C having a plurality of nodes, and an element B is connected to another node. Even in this case, the elements A and B are considered to be connected, unless otherwise specified.

First Embodiment

The schematic arrangement of a photoelectric conversion device according to the first embodiment will be explained with reference to the block diagram of FIG. 1. A photoelectric conversion device 100 includes a pixel array 104 in which a plurality of unit pixels 101 are arranged in a matrix. The pixel array 104 can include vertical signal lines 102 provided on the respective columns of the unit pixels 101, and row control lines 103 provided on the respective rows of the unit pixels 101. Further, the photoelectric conversion device 100 can include a vertical scanning circuit 105 that controls the row control lines 103, and a comparator circuit unit 106 that compares a pixel signal read out from the vertical signal line 102 with a reference signal to be described later. A counting circuit 109, and a memory circuit 107 that stores the count value of the counting circuit 109 based on the result of a comparison by the comparator circuit unit 106 may be arranged.

The photoelectric conversion device can include a reference signal generation circuit 108 that supplies, to the comparator circuit unit 106, a reference signal serving as a reference for comparison, and a signal processing circuit 110 that processes an output from the memory circuit 107. The photoelectric conversion device 100 can further include a horizontal scanning circuit 111 for reading out data from the memory, an output circuit 113 capable of externally outputting the result of processing by the signal processing circuit 110, and a control circuit 112 that controls the overall photoelectric conversion device 100.

The unit pixel 101 can include a pixel circuit (not shown) capable of including a photoelectric conversion element, a transfer transistor, a floating diffusion (to be referred to as FD hereinafter), a source follower circuit, and a selection transistor. The photoelectric conversion element can convert incident light into charges corresponding to the quantity of incident light. The transfer transistor can transfer the converted charges to the FD. The charges transferred to the FD can be read out as a pixel signal voltage (to be referred to as a pixel signal hereinafter) from the pixel circuit via the selection transistor from the source follower circuit. The pixel circuit can be configured to output a voltage of a reset level when the pixel circuit is reset.

The row control lines 103 can be provided on respective rows with respect to the rows of the unit pixels 101 arranged in the matrix. The vertical scanning circuit 105 can sequentially select the unit pixels 101 for each row by controlling the row control line 103 provided on each row and controlling the unit pixels 101 arranged on the row. The vertical signal lines 102 can be provided on respective columns with respect to the columns of the unit pixels 101 arranged in the matrix. The pixel signals of the unit pixels 101 of a row selected from the vertical scanning circuit 105 via the row control line 103 can be output to the vertical signal lines 102 and input to the comparator circuit unit 106.

A pixel signal readout operation includes two periods. One period is an N signal output period in which a noise signal voltage (to be referred to as an N signal hereinafter) of a reset level upon resetting the unit pixel 101 is read out before transferring charges accumulated in response to incident light. The other period is an S signal output period in which a photoelectrically converted signal voltage (to be referred to as an S signal hereinafter) including the N signal is read out after transferring charges accumulated in response to incident light. The N and S signals are output as pixel signals having a voltage to the vertical signal line 102 in accordance with a control signal from the vertical scanning circuit 105. The N and S signals output to the vertical signal line 102 are input to an analog-to-digital converter and converted into digital signals. The reset operation in the vertical scanning circuit 105 and the unit pixel 101, and charge accumulation in response to incident light can be performed at predetermined timings under the control of the control circuit 112.

Next, analog-to-digital conversion will be explained. A pixel signal output from the vertical signal line 102 is input to the comparator circuit unit 106 of the analog-to-digital converter. The reference signal generation circuit 108 generates and outputs a reference signal in each of the periods in which N and S signals are output. The reference signal is commonly input to the comparator circuit unit 106 constituted by a plurality of column circuits that are provided on respective columns and include a plurality of comparator circuits. Each of the comparator circuits compares a pixel signal from the vertical signal line 102 with a reference signal generated by the reference signal generation circuit 108. Note that it is also possible to generate two or more types of reference signals, select one of the reference signals, and input it to each comparator circuit.

An output signal from the counting circuit 109 is input to the memory circuit 107 to count up a time till time when an output from the comparator circuit changes after the start time of a comparison operation performed in the comparator circuit unit 106. The comparator circuit unit 106 outputs a comparison result when a reference signal and a pixel signal coincide with each other or either of them exceeds the other. At this timing, the count value is held in the memory circuit 107. Then, the S and N signals of analog signals are analog-to-digital-converted (to be referred to as A/D-converted hereinafter) into digital signals based on respective count values, and can be held as digital signals in the memory circuit 107 for each pixel.

Values held in the memory circuit 107 for respective columns are output to the signal processing circuit 110 in order for respective rows in accordance with a control signal output from the horizontal scanning circuit 111. The signal processing circuit 110 performs, for example, so-called correlated double sampling (CDS) to subtract an N signal from an S signal for each pixel, thereby removing the noise signal. The signal processed by the signal processing circuit 110 is externally read out as an image signal by the output circuit 113.

The control circuit 112 can control the timings and operations of the vertical scanning circuit 105, reference signal generation circuit 108, counting circuit 109, signal processing circuit 110, and horizontal scanning circuit 111. Note that the arrangement described in the embodiment is merely an example. For example, signals output to the vertical signal lines 102 may be amplified by column amplifiers provided on respective columns and then input to the comparator circuit unit 106. The counting circuit 109 is an up counter that counts up a time, but may be a down counter. Further, the memory circuit 107 may subtract an N signal from an S signal and hold a difference value between the S and N signals.

Figure 2:
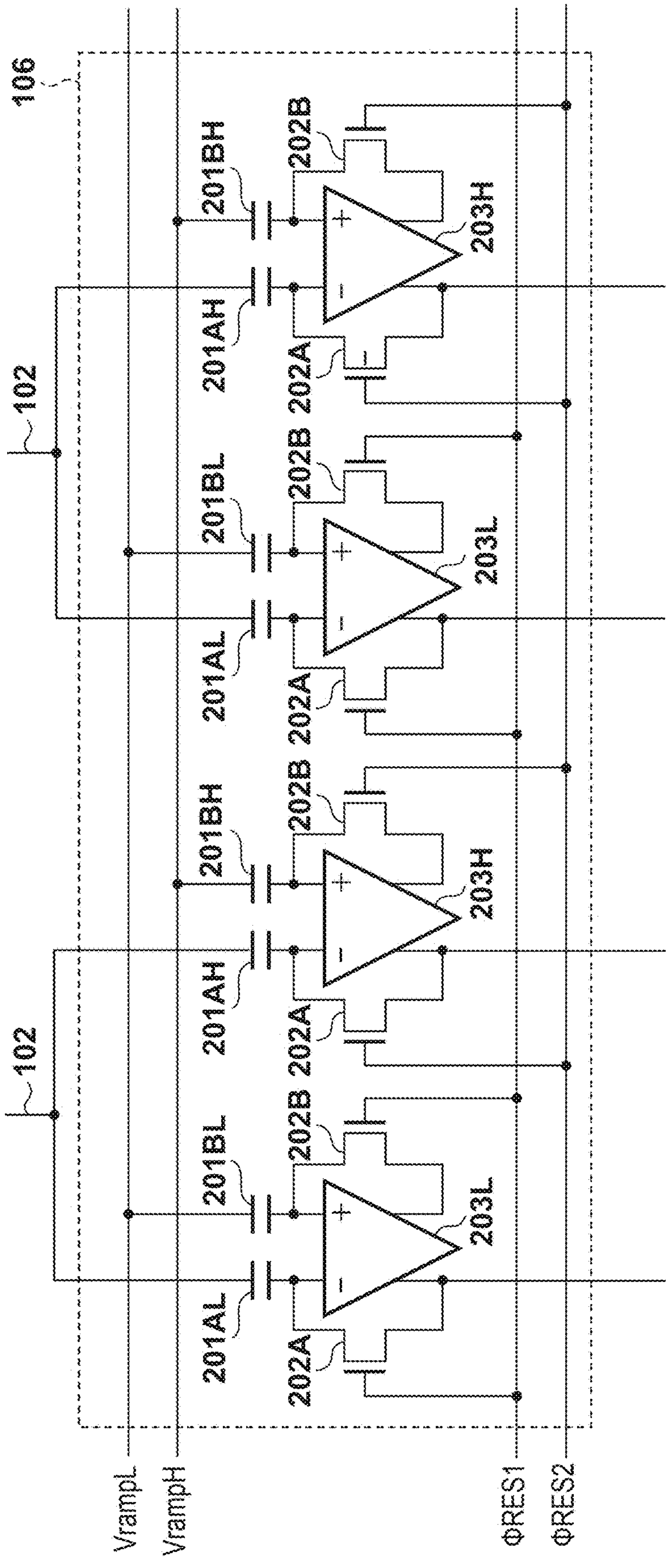
FIG. 2 is a circuit diagram showing an example of the arrangement of an analog-to-digital (A/D) converter according to the first embodiment.

Next, the circuit operation of the comparator circuit unit 106 according to the embodiment will be explained in detail with reference to FIGS. 2, 3A, and 3B. FIG. 2 shows an example of the arrangement of the comparator circuit unit 106 according to the embodiment. In the embodiment, a pixel signal output to one vertical signal line 102 is simultaneously input to the negative input terminals of comparator circuits 203L and 203H having inputs of a differential pair via input capacitances 201AL and 201AH. A reference signal VrampL is input to the positive input terminal of the comparator circuit 203L via an input capacitance 201BL, and a reference signal VrampH is input to the positive input terminal of the comparator circuit 203H via an input capacitance 201BH.

In the comparator circuit unit 106, a pixel signal is simultaneously input from one vertical signal line 102 to the two adjacent comparator circuits 203L and 203H, and compared with the different reference signals VrampH and VrampL. That is, times till times when outputs from the comparator circuits 203L and 203H change after the comparison start time can be different from each other with respect to the same pixel signal. Since the same pixel signal is A/D-converted based on the respective times, it is converted into different digital values and read out. In other words, the same pixel signal can be read out with different gains. By reading out the same pixel signal with different gains, high S/N can be ensured. In addition, the dynamic range can be widened.

Note that in the following description, when the input capacitances 201AL and 201AH need not be specified, they will be referred to as input capacitances 201A, and when the input capacitances 201BL and 201BH need not be specified, they will be referred to as input capacitances 201B. When the reference signals VrampL and VrampH need not be specified, they will be referred to as reference signals Vramp, and when the comparator circuits 203L and 203H need not be specified, they will be referred to as comparator circuits 203.

One of the drain and source of a switch 202A that can be constituted by a MOS transistor is connected to the negative input terminal of the comparator circuit 203 connected to the input capacitance 201A, and the other of the drain and source is connected to the output terminal of the comparator circuit 203. Similarly, one of the drain and source of a switch 202B is connected to the positive input terminal of the comparator circuit 203 connected to the input capacitance 201B, and the other of the drain and source is connected to the output terminal of the comparator circuit 203.

Control signals ϕRES1 and ϕRES2 are control signals connected to the gates of the switches 202A and 202B. Prior to analog-to-digital conversion, the comparator circuits 203L and 203H are reset based on control signals transmitted from the control circuit 112. Details of the reset operation of the comparator circuit 203 will be described with reference to FIGS. 3A and 3B.

Note that in the embodiment, the two comparator circuits 203L and 203H are controlled by the different control signals ϕRES1 and ϕRES2, but may be controlled by the same control signal. Note that when the control signals ϕRES1 and ϕRES2 need not be specified, they will be referred to as the control signals ϕRES for descriptive convenience.

Next, the comparison operation will be explained with reference to a timing chart showing the comparison operation of the comparator circuit 203 that constitutes the comparator circuit unit 106, and an output from the comparator circuit. An N signal output period and an S signal output period shown in FIG. 3A represent periods in which when N and S signals are output from the selected unit pixel 101 to the vertical signal line 102, they are respectively read out and A/D-converted. Note that the readout and A/D conversion can be repeated by the number of rows of one frame to read out an image of one frame.

A vertical signal line potential PixSig represents a pixel signal output from the same unit pixel 101. The vertical signal line potential PixSig represents a temporal change of the potential of the vertical signal line 102. The reference signal Vramp represents temporal changes of the potentials of the two types of reference signals VrampL and VrampH.

Subsequently, the comparison operation of the comparator circuit 203 will be explained with reference to the timing chart of FIG. 3A. First, before time t301, the reference signals VrampL and VrampH are changed from a potential Vp set at the start of the readout operation to potentials VL0 and VH0 lower than the potential Vp. In the embodiment, the potential VL0 is set to be a voltage lower than the potential VH0. Note that the absolute values of the change amounts of the two potentials are defined as offset voltages ΔVoffset.

Figure 3A:
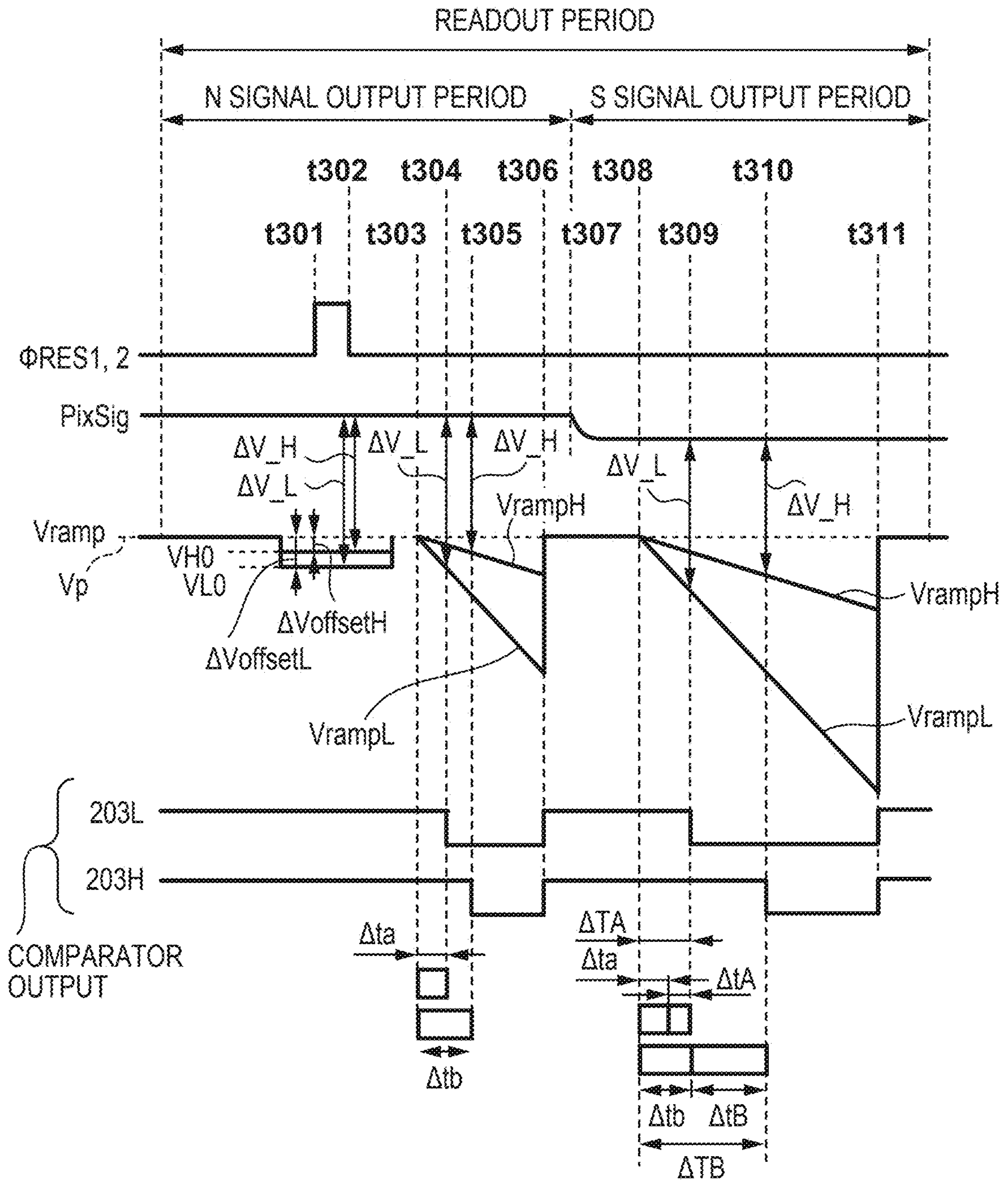
FIGS. 3A and 3B are timing charts of driving of the A/D converter according to the first embodiment.

In FIG. 3A, an offset voltage for the reference signal VrampL is defined as ΔVoffsetL (=Vp−VL0), and an offset voltage for the reference signal VrampH is defined as ΔVoffsetH (=Vp−VH0). In this example, the absolute values of the two offset voltages have a relation of |Vp−VL0|>|Vp−VH0|. A period from time t301 to time t302 is a period in which the reset operation of the comparator circuit 203 is performed by controlling ϕRES.

At time t301, the control signal ϕRES changes from L level to H level to turn on the switches 202A and 202B of the comparator circuit 203. At this time, the two input terminals of the comparator circuit 203 are respectively short-circuited to the output terminal to reset the comparator circuit 203. The potential of a node to which one terminal of the input capacitance 201A or 201B and the input terminal of the comparator circuit 203 are connected is changed to the reset potential, and the comparator circuit 203 keeps an equilibrium state.

Then, at time t302, the control signal ϕRES changes from H level to L level to turn off the switches 202A and 202B, canceling the reset state. At this time, the difference between the voltage of the vertical signal line 102 connected to one terminal of the input capacitance 201A, and the voltage of the negative input terminal of the comparator circuit 203 in the equilibrium state that is connected to the other terminal of the input capacitance 201A is held in the input capacitance 201A. Also, the difference between the offset voltage ΔVoffsetL applied to one terminal of the input capacitance 201BL, and the voltage of the positive input terminal of the comparator circuit 203 in the equilibrium state that is connected to the other terminal of the input capacitance 201BL is held in the input capacitance 201BL. The difference between the offset voltage ΔVoffsetH applied to one terminal of the input capacitance 201BH, and the voltage of the positive input terminal of the comparator circuit 203 in the equilibrium state that is connected to the other terminal of the input capacitance 201BH is held in the input capacitance 201BH.

That is, the reset potential of the comparator circuit 203 is set and held between the node of one terminal of the input capacitance 201A or 201B, and the node to which the input terminal of the comparator circuit 203 is connected. In other words, a potential difference ΔV−(t302) at time t302 between the voltage of the negative input terminal of the comparator circuit 203 and the vertical signal line potential of the reset level of a pixel when the pixel is reset is held in the input capacitance 201A. A potential difference ΔV+(t302) at time 302 between the voltage of the positive input terminal of the comparator circuit 203 and the reference signal Vramp is held in the input capacitance 201B. In this manner, predetermined voltages can be respectively set in the input capacitances 201A and 201B.

In the following description, time t is a variable, the voltage difference between the negative input terminal of the comparator circuit 203 and the vertical signal line 102 is represented as ΔV−(t), and the voltage difference between the positive input terminal of the comparator circuit 203 and the reference signal Vramp is represented as ΔV+(t). A potential obtained by subtracting ΔV+(t302) from ΔV−(t302) at time t302 when the reset operation of the comparator circuit is performed is represented as Vth (=ΔV−(t302)−ΔV+(t302)). After the reset state of the comparator circuit is canceled, when the difference between ΔV−(t) and ΔV+(t) becomes larger or smaller than Vth, an output from the comparator circuit changes. Vth is defined as a logical threshold voltage. In other words, the potential difference between the vertical signal line potential PixSig and the reference signal Vramp at time t302 will be referred to as a logical threshold voltage ΔV (=PixSig−Vramp).

The potential Vth obtained by subtracting ΔV+(t302) from ΔV−(t302) by the reset operation is set in the input capacitances 201A and 201B respectively connected to the two input terminals of the comparator circuit. In other words, from time t302 when reset is canceled, an output from the comparator circuit changes when the difference between the vertical signal line potential PixSig and the reference signal Vramp becomes larger than the difference (=Vth) at time t302. This timing will be referred to as an output change timing. The reset operation of the comparator circuit is also called auto-zero.

A logical threshold voltage ΔV_L is defined as a difference between the vertical signal line potential PixSig and a reference signal Vramp_L in a period from time t301 to time t302, as shown in FIG. 3A. A logical threshold voltage ΔV_H is defined as a difference between the vertical signal line potential PixSig and a reference signal Vramp_H in the same period, the period from time t301 to time t302.

It should be noted that the logical threshold voltages ΔV_L and ΔV_H can be adjusted to desired values by setting the offset voltage ΔVoffset. The timing when an output from the comparator circuit 203 changes can be adjusted by the logical threshold voltage. Note that details of the method of setting the offset voltage ΔVoffset in the embodiment will be described later. Then, from time t302 to time t303, the reference signal Vramp is reset to the potential Vp in order to ensure the linearity of an output with respect to an input of the vertical signal line potential from time t303 to time t306 by changing an output from the comparator circuit at a timing when the linearity of the reference signal Vramp is ensured.

More specifically, the linearity of the reference signal Vramp immediately after time t303 is poor immediately after the potential starts monotonously decreasing from the predetermined potential Vp, but the linearity improves with time from time t303. That is, the comparator circuit can perform the comparison operation using a high-linearity part of the reference signal Vramp by the offset voltage.

Then, from time t303 to time t306, the reference signal Vramp monotonously decreases from the potential Vp, and the comparison operation is performed between the vertical signal line potential of the N signal of the unit pixel 101 and the reference signal Vramp. At this time, the absolute value of the temporal change amount of the reference signal VrampL is defined as dVL/dt, and the absolute value of the temporal change amount of the reference signal VrampH is defined as dVH/dt. dVL/dt is larger than dVH/dt (dVL/dt>dVH/dt).

In the embodiment, an output from the comparator circuit 203 changes at a timing when the potential difference between the vertical signal line potential of the N signal and the reference signal Vramp becomes larger than the logical threshold voltage ΔV. That is, an output from the comparator circuit 203L changes at time t304, and an output from the comparator circuit 203H changes at time t305.

Here, a time Δta is a time from time t303 to time t304, and a time Δtb is a time from time t303 to time t305. Note that the counting circuit performs counting from time t303 to time t306, and outputs a counter value. An N signal input to the comparator circuits 203L and 203H is converted into digital signals based on counter values respectively corresponding to the times Δta and Δtb. The digital signals are held in the memory circuit 107. Note that this operation is A/D conversion of an N signal.

Then, at time t306, when the monotonously decreasing reference signal Vramp is reset to the potential Vp set at the start of the readout operation, an output from the comparator circuit 203 is reset to a state before the change. A change of Vramp starts from the potential Vp in order to perform the comparison operation by the comparator circuit at a timing when the linearity of the reference signal Vramp is excellent, as described above. In particular, it is important for improving the image quality to ensure the linearity with respect to a low-luminance signal in a period from time t308 to time t311 in which the comparison operation between the vertical signal line potential of an S signal and the reference signal Vramp is performed.

Then, at time t307, the vertical signal line potential PixSig starts outputting an S signal based on charges photoelectrically converted in the selected unit pixel 101. The period changes from the N signal output period to the S signal output period, and the S signal output period starts. At this time, in a period from time t307 to time t308, it is preferable to ensure a time until the vertical signal line potential PixSig changes from an N signal output to an S signal output and the S signal output stabilizes.

Then, from time t308 to time t311, the reference signal Vramp monotonously decreases, and the comparison operation is performed between the vertical signal line potential of the S signal of the unit pixel 101 and the reference signal Vramp. An output from the comparator circuit 203L changes at time t309, and an output from the comparator circuit 203H changes at time t310.

A time from time t308 to time t309 is represented as ΔTA. That is, the time ΔTA is a time corresponding to an S signal containing an N signal component, and the difference between the time ΔTA and the time Δta corresponding to the N signal is a time ΔtA. The time ΔtA is a time corresponding to an S signal containing no N signal component. Similarly, a time from time t308 to time t310 is represented as ΔTB. That is, the time ΔTB is a time corresponding to an S signal containing an N signal component. The difference between the time ΔTB and the time Δtb corresponding to the N signal is a time ΔtB. The time ΔtB is a time corresponding to an S signal containing no N signal component.

The counting circuit performs counting from time t308 to time t311, and outputs a counter value. The vertical signal line potential of an S signal input to the comparator circuits 203L and 203H is converted into digital signals based on counter values in correspondence with the time ΔTA (=Δta+ΔtA) and the time ΔTB (=Δtb+ΔtB), and the digital signals are held in the memory circuit 107.

Then, at time t311, when the monotonously decreasing reference signal Vramp is reset to the potential Vp set at the start of the readout operation, the comparator circuit 203 is reset to a state before the output change. In this fashion, N and S signals are sequentially read out. Here, an output change of the comparator circuit 203 in the N signal comparison operation from time t303 to time t306, and control of the timing in the embodiment will be explained below.

A feature of the embodiment is that the output change timing of the comparator circuit 203L is earlier than that of the comparator circuit 203H in the N signal comparison operation. That is, the time Δta is set to be smaller than the time Δtb (Δta<Δtb). Even in the S signal comparison operation from time t308 to time t311, the output change timing of the comparator circuit 203 can change.

Next, the S signal comparison operation will be explained. As shown in the example of FIG. 3A, dVL/dt is larger than dVH/dt in the temporal change amounts of the reference signals VrampL and VrampH, so the time ΔtA becomes smaller than the time ΔtB in the S signal output period (ΔtA<ΔtB). The total time ΔTA of the times Δta and ΔtA becomes smaller than the total time ΔTB of the times Δtb and ΔtB (ΔTA (=Δta+ΔtA)<ΔTB (=Δtb+ΔtB)). That is, even in the S signal comparison operation, similar to the N signal comparison operation, the output change timing of the comparator circuit 203L is earlier than that of the comparator circuit 203H.

Next, a case where the time Δta is larger than the time Δtb (Δta>Δtb) will be explained. In this case, the output changes of the comparator circuits 203L and 203H can be simultaneously detected depending on the magnitude of the S signal. As described above, dVL/dt is larger than dVH/dt in the temporal change amounts of the reference signals VrampL and VrampH, so the time ΔtA becomes smaller than the time ΔtB (ΔtA<ΔtB). At this time, the difference (that is, ΔtB−ΔtA) between the time ΔtA and the time ΔtB is determined in accordance with the magnitude of a vertical signal line potential input to the comparator circuit.

If a change of the vertical signal line potential of the S signal output period is larger than that of the N signal output period, the difference between the time ΔtA and the time ΔtB becomes large. Depending on the vertical signal line potential of the S signal output period with respect to the N signal output period, the difference (ΔtB−ΔtA) between the time ΔtA and the time ΔtB sometimes becomes equal to the difference (Δta−Δtb) between the time Δta and the time Δtb. That is, the sum of the time Δta and the time ΔtA can become equal to that of the time Δtb and the time ΔtB (that is, ΔTA (=Δta+ΔtA)=ΔTB (=Δtb+ΔtB)).

When light of a luminance representing an S signal that satisfies the above relation is received, an output from the comparator circuit 203L and an output from the comparator circuit 203H simultaneously change in the S signal comparison operation. If outputs from many comparator circuits simultaneously change, a large current instantaneously flows. A power supply voltage supplied to the circuits varies, the circuits malfunction, and noise affects another signal line, failing to implement an accurate circuit operation. As a result, the quality of a sensed image can degrade.

To prevent this, according to the embodiment, the time Δta is set to be always smaller than the time Δtb so as to establish a relation of Δta+ΔtA<Δtb+ΔtB. Regardless of the vertical signal line potential, the change timing of an output from the comparator circuit 203L and that of an output from the comparator circuit 203H can differ from each other.

Figure 3B:
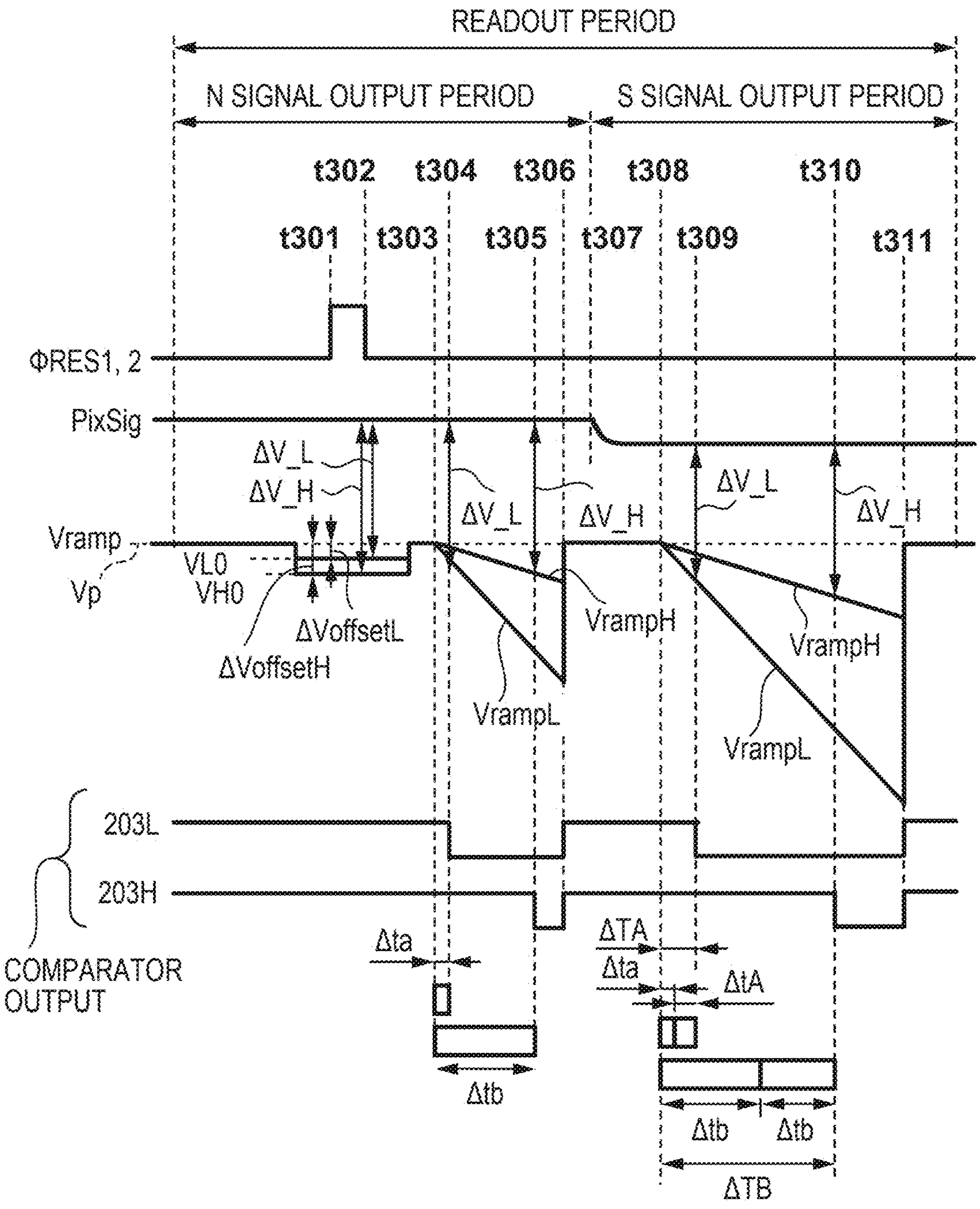

Even in a case where ΔVoffsetL is set to be smaller than ΔVoffsetH, as shown in FIG. 3B, the time Δta is set to be smaller than the time Δtb. Even in this case, dVL/dt is larger than dVH/dt in the temporal change amounts of the reference signals VrampL and VrampH, so the relation of Δta+ΔtA<Δtb+ΔtB can be established. Hence, the change timing of an output from the comparator circuit 203L and that of an output from the comparator circuit 203H can differ from each other regardless of the magnitude of the vertical signal line potential PixSig.

The above temporal relation will be examined in terms of the change amounts (to be referred to as rates of temporal change hereinafter) of the offset voltage and the voltage of the reference signal with respect to the time. For descriptive convenience, assume that the reference signal VrampL and the reference signal VrampH change from time 0 in accordance with their rates of temporal change. The comparator circuit 203H performs a comparison with the reference signal VrampH, and a set offset amount is VoffsetH. The comparator circuit 203L performs a comparison with the reference signal VrampL, and a set offset amount is VoffsetL. The rate dVL/dt of temporal change of the reference signal VrampL is represented as a, and the rate dVH/dt of temporal change of the reference signal VrampH is represented as b. At this time, the magnitude relationship between the rates of temporal change is the rate dVL/dt (=a) of temporal change>the rate dVH/dt (=b) of temporal change.

Considering that the reference signal is displaced only by the offset amount, an output from the comparator circuit 203H changes when VrampH becomes VoffsetH after a time T1. This is given by an equation of VoffsetH=bT1. Similarly, an output from the comparator circuit 203L changes after a time T2, that is, VoffsetL=aT2. To satisfy T1>T2, a relation of (VoffsetH/b)>(VoffsetL/a) is established. In other words, the offset voltage is set so that the product of the reciprocal of the rate b of temporal change (=dVH/dt) and the offset voltage VoffsetH becomes smaller than that of the reciprocal of the rate a of temporal change (=dVL/dt) and the offset voltage VoffsetL.

Accordingly, there can be provided a photoelectric conversion device capable of suppressing an operation in which outputs from many comparator circuits simultaneously change, and reducing noise at the time of A/D conversion in driving of simultaneously reading out pixel signals with different gains.

Note that the embodiment has a feature in which the output change timing of the comparator circuit 203L in A/D conversion of an N signal is set to be earlier than that of the comparator circuit 203H. The arrangement for this feature is not limited to a case where the offset voltage ΔVoffset is set in the reset operation of the comparator circuit. It is only sufficient to apply a predetermined offset voltage to voltages between signals, that is, the start voltage of a reference signal and the reset voltage of a pixel signal in the reset operation of the comparator circuit. For example, voltage control is performed on the vertical signal line 102 to apply an offset voltage to a pixel signal, thereby controlling the change timing.

In the description of the embodiment, a monotonously decreasing reference signal is used. However, the reference signal may be a monotonously increasing reference signal. When the reference signal monotonously increases, the potentials VL0 and VH0 and the offset voltages ΔVoffsetL and ΔVoffsetH can be set to potentials higher than the potential Vp at the start of readout.

In this manner, according to the embodiment, it is effective for noise suppression to set the output change timing of the comparator circuit 203L to be earlier than that of the comparator circuit 203H in A/D conversion of N signals of a row that are simultaneously read out. However, the effects of the embodiment can be obtained as long as the above-described timing relationship is established for at least one of the unit pixels 101 of a row from which signals are simultaneously read out.

Second Embodiment

A photoelectric conversion device 100 according to the second embodiment of the present invention will be explained below. According to the second embodiment, similar to the first embodiment, in an N signal comparison operation, an output from a comparator circuit that performs a comparison using a reference signal having a high rate of temporal change is changed earlier than an output from a comparator circuit that performs a comparison using a reference signal having a low rate of temporal change. This can suppress a simultaneous change of outputs from the comparator circuits in the S signal comparison operation. Further, noise can be further reduced by distributing output change timings in the N signal comparison operation in different comparator circuits that simultaneously perform a comparison operation using reference signals having the same rate of temporal change.

Figure 4:
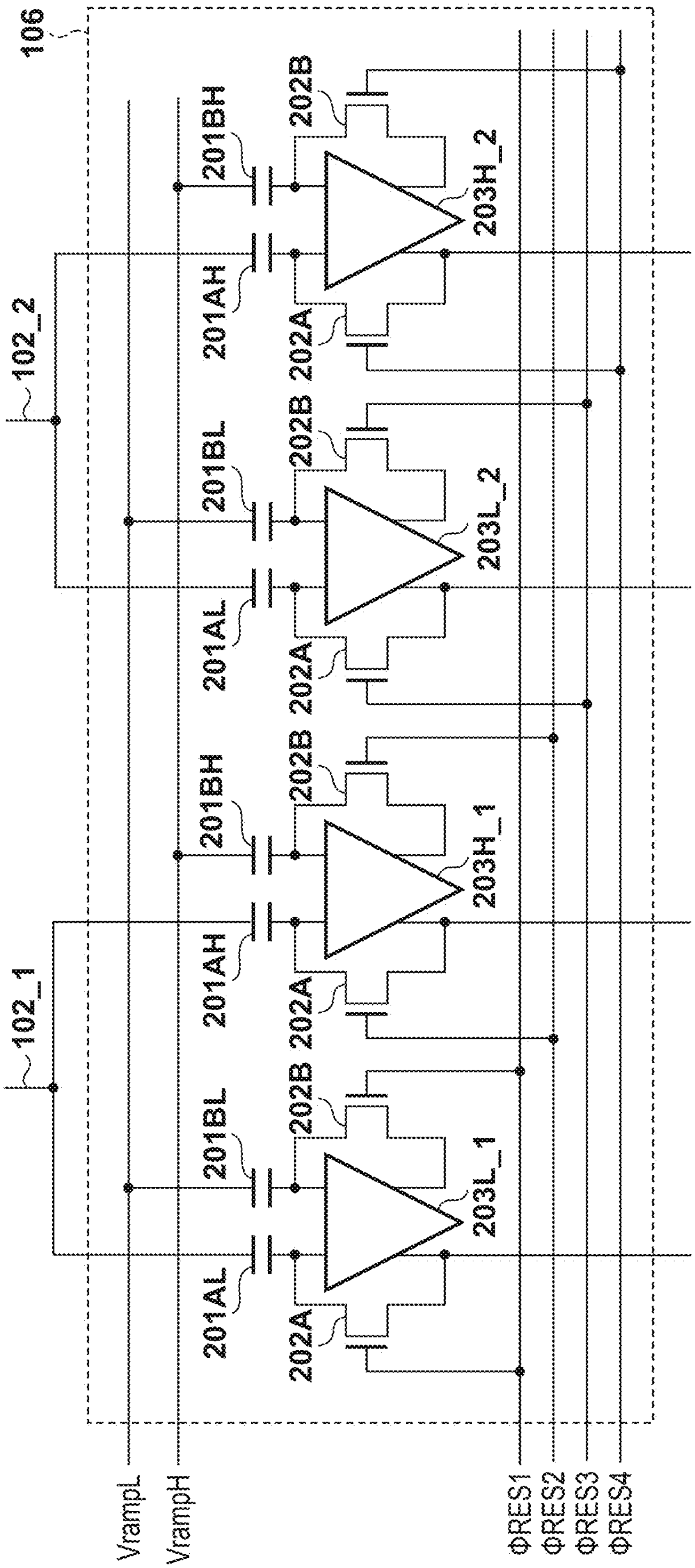
FIG. 4 is a circuit diagram showing an example of the arrangement of an A/D converter according to the second embodiment.
Figure 5:
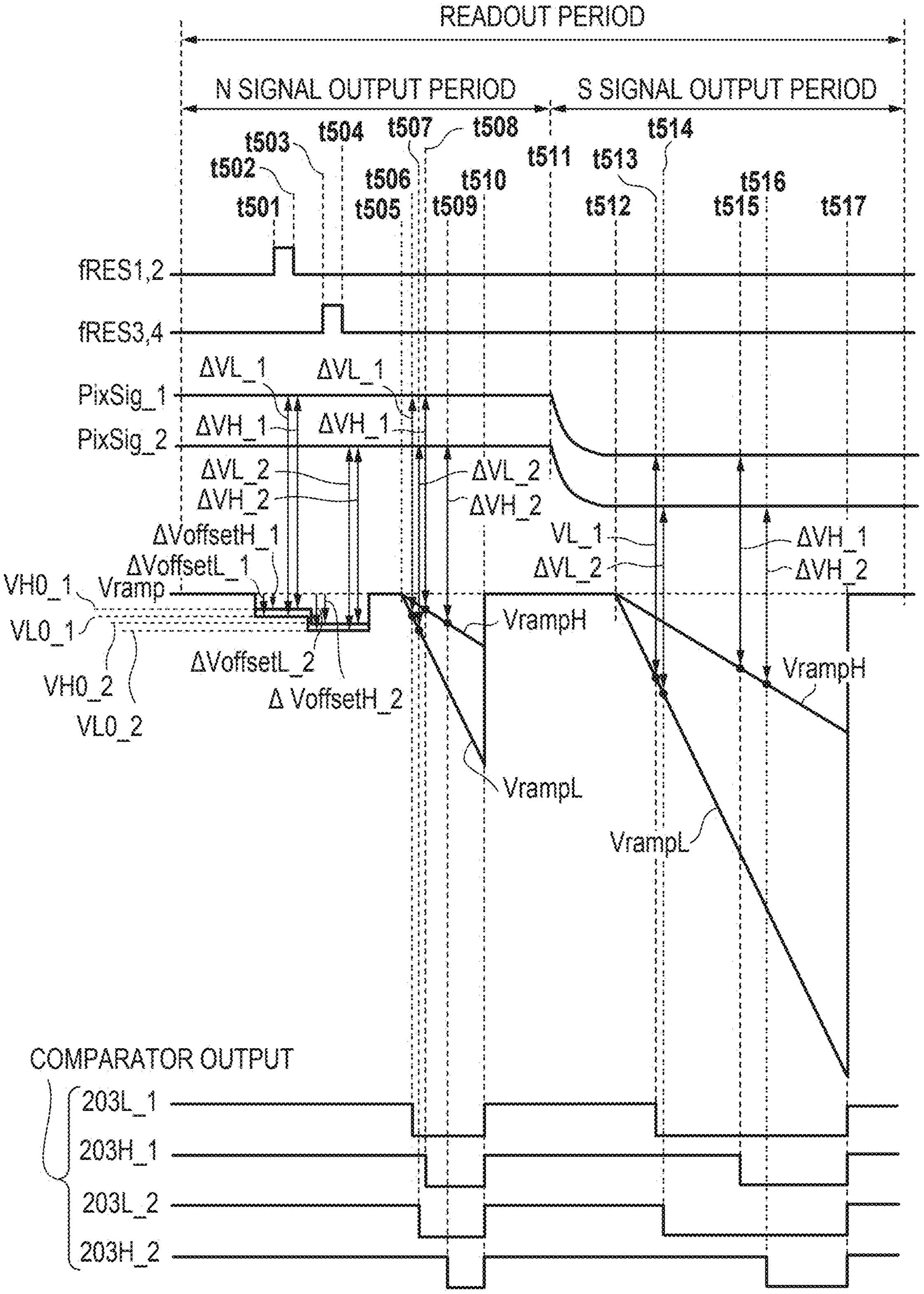
FIG. 5 is a timing chart of driving of the A/D converter according to the second embodiment.

A difference of the second embodiment from the first embodiment will be explained with reference to FIGS. 4 and 5. FIG. 4 shows an example of the arrangement of a comparator circuit unit 106 according to the second embodiment. In the second embodiment, control signals ϕRES that reset comparator circuits are respectively set for a comparator circuit corresponding to arbitrary first unit pixels 101 and a comparator circuit corresponding to second unit pixels 101 arranged on a column different from that of the first unit pixels 101. A pixel signal from the first unit pixel is input to comparator circuits 203L_1 and 203H_1 of the comparator circuit unit 106 via a vertical signal line 102-1. A pixel signal from the second unit pixel is input to comparator circuits 203L_2 and 203H_1 via a vertical signal line 102-2.

The first pixel signal output from the first unit pixel 101 is input to a comparator circuit 203L_1 reset-controlled by a control signal ϕRES1, and a comparator circuit 203H_1 reset-controlled by a control signal ϕRES2. The comparator circuits 203L_1 and 203H_1 respectively receive reference signals VrampL and VrampH, and compare them with the pixel signals. The second pixel signal output from the second unit pixel 101 is input to a comparator circuit 203L_2 reset-controlled by a control signal ϕRES3, and a comparator circuit 203H_2 reset-controlled by a control signal ϕRES4. When the following description is not limited to any of the four comparator circuits, the four comparator circuits will be collectively referred to as comparator circuits 203.

By the above arrangement, the respective comparator circuits 203 corresponding to pixel signals of the plurality of unit pixels 101 arranged on different columns from which signals are simultaneously read out can be reset by the different control signals ϕRES, and a logical threshold voltage ΔV can be set at different timings.

Next, the comparison operation of the comparator circuit 203 that constitutes the comparator circuit unit 106 according to the embodiment will be explained with reference to FIG. 5. An N signal output period and an S signal output period shown in FIG. 5 represent periods in which N and S signals are read out from the first and second unit pixels 101. PixSig1 and PixSig2 respectively represent time transitions of potentials in the vertical signal lines 102 based on pixel signals respectively output from the first and second unit pixels 101.

By a method similar to the first embodiment, logical threshold voltages ΔVL_1 and ΔVH_1 are set in the comparator circuits 203L_1 and 203H_1, and then logical threshold voltages ΔVL_2 and ΔVH_2 are set in the comparator circuits 203L_2 and 203H_2.

First, the logical threshold voltages ΔVL_1 and ΔVH_1 of the comparator circuits 203L_1 and 203H_1 are set. Before time t501, the respective reference signals VrampL_1 and VrampH_1 are changed from voltages set at the start of a readout operation to VL0_1 and VH0_1. After that, from time t501 to time t502, the comparator circuit 203L_1 is reset by the control signal ϕRES1, and the comparator circuit 203H_1 is reset by the control signal ϕRES2. After canceling the reset of the comparator circuits 203L_1 and 203H_1, the logical threshold voltages ΔVL_1 and ΔVH_1 are respectively set in the two comparator circuits 203L_1 and 203H_1, similar to the first embodiment.

Subsequently, the logical threshold voltages ΔVL_2 and ΔVH_2 of the comparator circuits 203L_2 and 203H_2 are set. In a period from time t502 to time t503, the respective reference signals VrampL_2 and VrampH_2 are changed from voltages set at the start of a readout operation to VL0_2 and VH0_2. Then, from time t503 to time t504, the comparator circuit 203L_2 is reset by the control signal ϕRES3, and the comparator circuit 203H_2 is reset by the control signal ϕRES4. After canceling the reset of the comparator circuits 203, the logical threshold voltages ΔVL_2 and ΔVH_2 are respectively set in the two comparator circuits 203L_2 and 203H_2, similar to the first embodiment.

Although the control signals ϕRES1 and ϕRES2 are changed at the same time, and the control signals ϕRES3 and ϕRES4 are changed at the same time to reset the comparator circuits in the second embodiment, they may be changed at different timings. The offset voltage ΔVoffset is defined, similar to the first embodiment. An offset voltage for the reference signal VrampL determined by a voltage at time t502 is represented as ΔVoffsetL_1, and an offset voltage for the reference signal VrampH is represented as ΔVoffsetH_1. Similarly, an offset voltage for the reference signal VrampL determined by a voltage at time t504 is represented as ΔVoffsetL_2, and an offset voltage for the reference signal VrampH is represented as ΔVoffsetH_2.

Unlike the first embodiment, different control signals ϕRES can be set for the comparator circuits 203 that receive different pixel signals, and be reset stepwise to change the same reference signal Vramp and adjust ΔVoffset for each comparator circuit 203.

A period from time t505 to time t510 is an N signal comparison operation period, and N signals from the first and second unit pixels 101 are compared with the reference signal Vramp. In accordance with the corresponding logical threshold voltages ΔV, an output from the comparator circuit 203L_1 changes at time t506, an output from the comparator circuit 203L_2 changes at time t507, an output from the comparator circuit 203H_1 changes at time t508, and an output from the comparator circuit 203H_2 changes at time t509.

At time t511, S signals from the first and second unit pixels are output to the vertical signal lines 102. A period from time t512 to time t517 is an S signal comparison operation period, and S signals from the first and second unit pixels are compared with the reference signal Vramp.

In accordance with the corresponding logical threshold voltages ΔV, an output from the comparator circuit 203L_1 changes at time t513, an output from the comparator circuit 203L_2 changes at time t514, an output from the comparator circuit 203H_1 changes at time t515, and an output from the comparator circuit 203H_2 changes at time t516.

Subsequently, control of the output change timing of the comparator circuit 203 in the N signal comparison operation will be explained. In the embodiment, the output change timing in comparison for an N signal is made different between the comparator circuits 203 that perform a comparison using reference signals having the same rate of temporal change, that is, between the comparator circuits 203L_1 and 203L_2 and the comparator circuits 203H_1 and 203H_2.

In the N signal comparison operation, the comparator circuits 203 are driven so that the output change timings of the comparator circuits 203L_1 and 203L_2 become earlier than those of the comparator circuits 203H_1 and 203H_2. By this driving, the inversion operations of the comparator circuits for a single pixel and two different pixels can be performed at different timings.

This will be examined on the premise that the rate of temporal change of the reference signal VrampL is represented as a, the rate of temporal change of the reference signal VrampH is represented as b, and a>b. The offset voltage of the comparator circuit 203L_1 corresponding to the first unit pixel is represented as V1, and the offset voltage of the comparator circuit 203H_1 is represented as V2. The offset voltage of the comparator circuit 203L_2 corresponding to the second unit pixel is represented as V3, and the offset voltage of the comparator circuit 203H_2 is represented as V4. A timing T1 when an output from the comparator circuit 203L_1 changes is given by T1=(V1/a), and a timing T2 when an output from the comparator circuit 203H_1 changes is given by T2=(V2/b). Similarly, a timing T3 when an output from the comparator circuit 203L_2 changes is given by T3=(V3/a), and a timing T4 when an output from the comparator circuit 203H_2 changes is given by T4=(V4/b). When the relationship between the timings is set so that T1 and T3 become smaller than either T2 or T4, the simultaneous change of the outputs of the comparator circuits can be suppressed. This can be rewritten as follows.

It is preferable that each of the product of the reciprocal of the rate a of temporal change and the offset voltage V1 and the product of the reciprocal of the rate a of temporal change and the offset voltage V3 is set to be smaller than either of the product of the reciprocal of the rate b of temporal change and the offset voltage V2 and the product of the reciprocal of the rate b of temporal change and the offset voltage V4. This can distribute the comparison operation timings of N signals even in the comparator circuits 203 that perform a comparison using the same reference signal in readout of N signals and readout of S signals.

Note that when the potential difference between the S signals of the first and second pixel signals is large, the comparator circuits 203 can simultaneously change in the S signal comparison operation. More specifically, outputs from the comparator circuits 203 can simultaneously change when the time difference in the case where the potential difference between the S signals of the first and second pixel signals becomes larger than the time difference between the output change timings of the comparator circuits 203 generated by ΔVoffset or the rate of temporal change of the reference signal Vramp. Since the potential difference between the S signals of the first and second pixel signals is highly likely to be small in pixels of the same color that are arranged near, the offset voltage ΔVoffset desirably differs between pixels of the same color that are arranged near.

Note that, similar to the first embodiment, ΔVoffsetL_2>ΔVoffsetH_2 is set in addition to a relation of ΔVoffsetL_1>ΔVoffsetH_1. This setting can further suppress a simultaneous change of outputs from the comparator circuits 203 in terms of the rate of temporal change of the reference signal. Although two types of offset voltages are set for the comparator circuits 203 that perform a comparison using reference signals having the same rate of temporal change in the embodiment, three or more types of offset voltages may be set. In this case, the output change timings of the comparator circuits 203 are further distributed.

The embodiment has a feature in which, in the N signal comparison operation, an output from the comparator circuit 203 that performs a comparison using a reference signal having a high rate of temporal change is changed earlier than an output from any comparator circuit 203 that performs a comparison using a reference signal having a low rate of temporal change. A method for this feature is not limited to setting the offset voltage ΔVoffset for the reference signal. A similar effect can be obtained even by setting an offset voltage for the vertical signal line. In addition to the effects of the first embodiment, the second embodiment can be used to further suppress a simultaneous change of many comparator circuits 203 in the N signal comparison operation.

Third Embodiment

A photoelectric conversion device 100 that performs driving according to the third embodiment of the present invention will be explained below. In the third embodiment, a method of obtaining gain in the second embodiment is changed. In the first and second embodiments, digital values can be obtained with different gains in A/D conversion by making different the reference signal Vramp having the rate of temporal change between the N signal readout period and the S signal readout period. The third embodiment will describe the form of the photoelectric conversion device in which vertical signal line potentials are amplified with different gains by a column amplifier and output.

Figure 6:
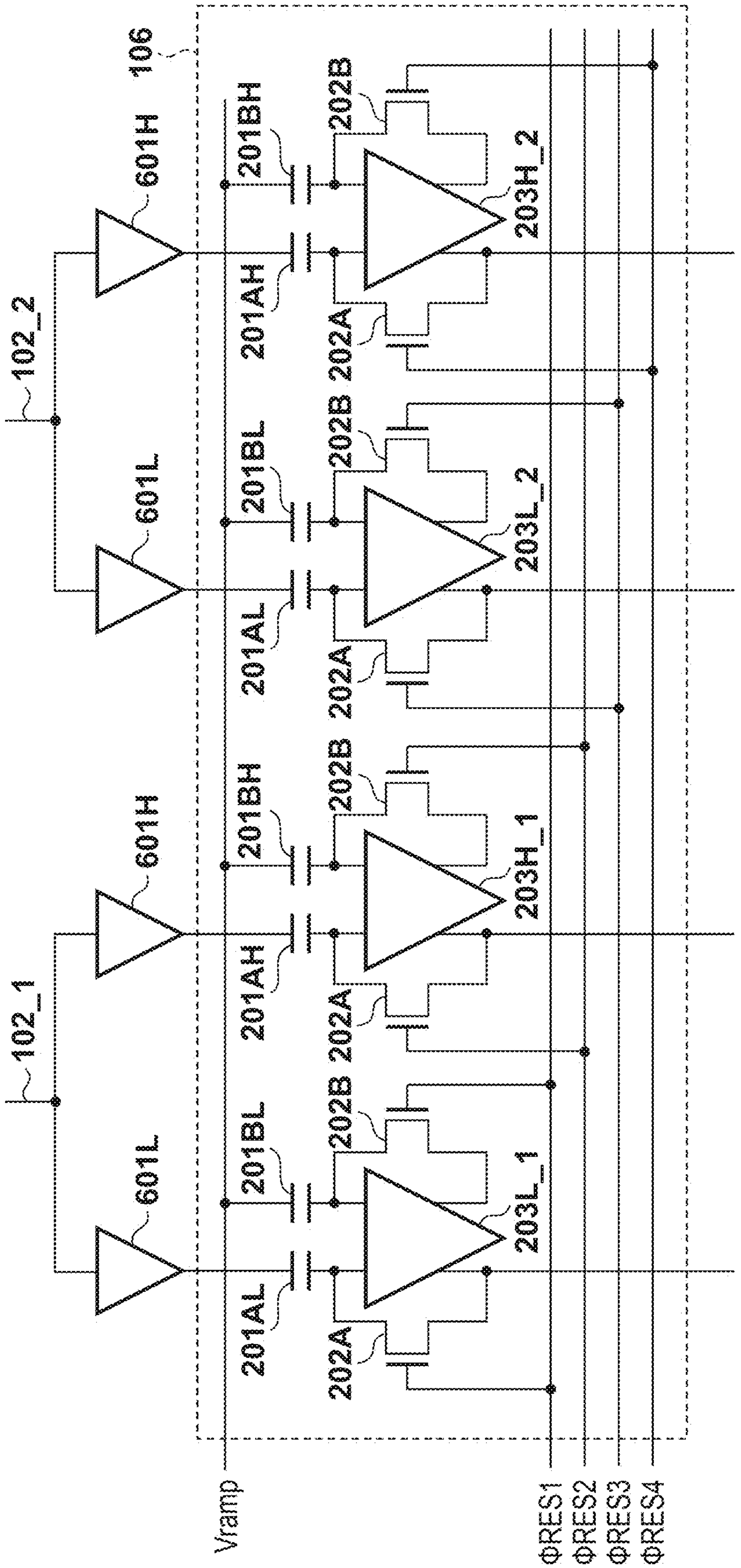
FIG. 6 is a circuit diagram showing an example of the arrangement of an A/D converter according to the third embodiment.

A difference of the third embodiment from the second embodiment will be explained with reference to FIGS. 6 and 7. FIG. 6 shows an example of a comparator circuit unit 106 according to the third embodiment.

First and second pixel signals output to vertical signal lines 102_1 and 102_2 are respectively amplified with a low gain by column amplifiers 601L each serving as an amplifier circuit, and amplified with a high gain by column amplifiers 601H. Note that a case where the same pixel signal is converted with a low amplification factor by the column amplifier is represented as amplifying the pixel signal with a low gain, and a case where the same pixel signal is converted with a high amplification factor by the column amplifier is represented as amplifying the pixel signal with a high gain. When the column amplifiers 601L and 601H need not be specified, they will be referred to as column amplifiers 601.

The first pixel signal amplified by the column amplifier 601L is input to a comparator circuit 203L_1 reset-controlled by a control signal ϕRES1. The first pixel signal amplified by the column amplifier 601H is input to a comparator circuit 203H_1 reset-controlled by a control signal ϕRES2.

Similarly, the second pixel signal amplified by the column amplifier 601L is input to a comparator circuit 203L_2 reset-controlled by a control signal ϕRES3. The second pixel signal amplified by the column amplifier 601H is input to a comparator circuit 203H_2 reset-controlled by a control signal ϕRES4.

Unlike the second embodiment, a common reference signal Vramp is input to all the comparator circuits 203, and the first and second pixel signals are compared with the reference signal Vramp having a common rate of temporal change. It should be noted that, similar to the second embodiment, the same pixel signal can be simultaneously output with different gains by amplifying the same pixel signal with different gains and then inputting the amplified signals to the different comparator circuits 203 by the above-described arrangement. In addition, the control signals ϕRES1 to ϕRES4 are provided, as described above. With this arrangement, even in the third embodiment, the comparator circuits 203 connected to different unit pixels 101 can be reset at different timings.

Figure 7:
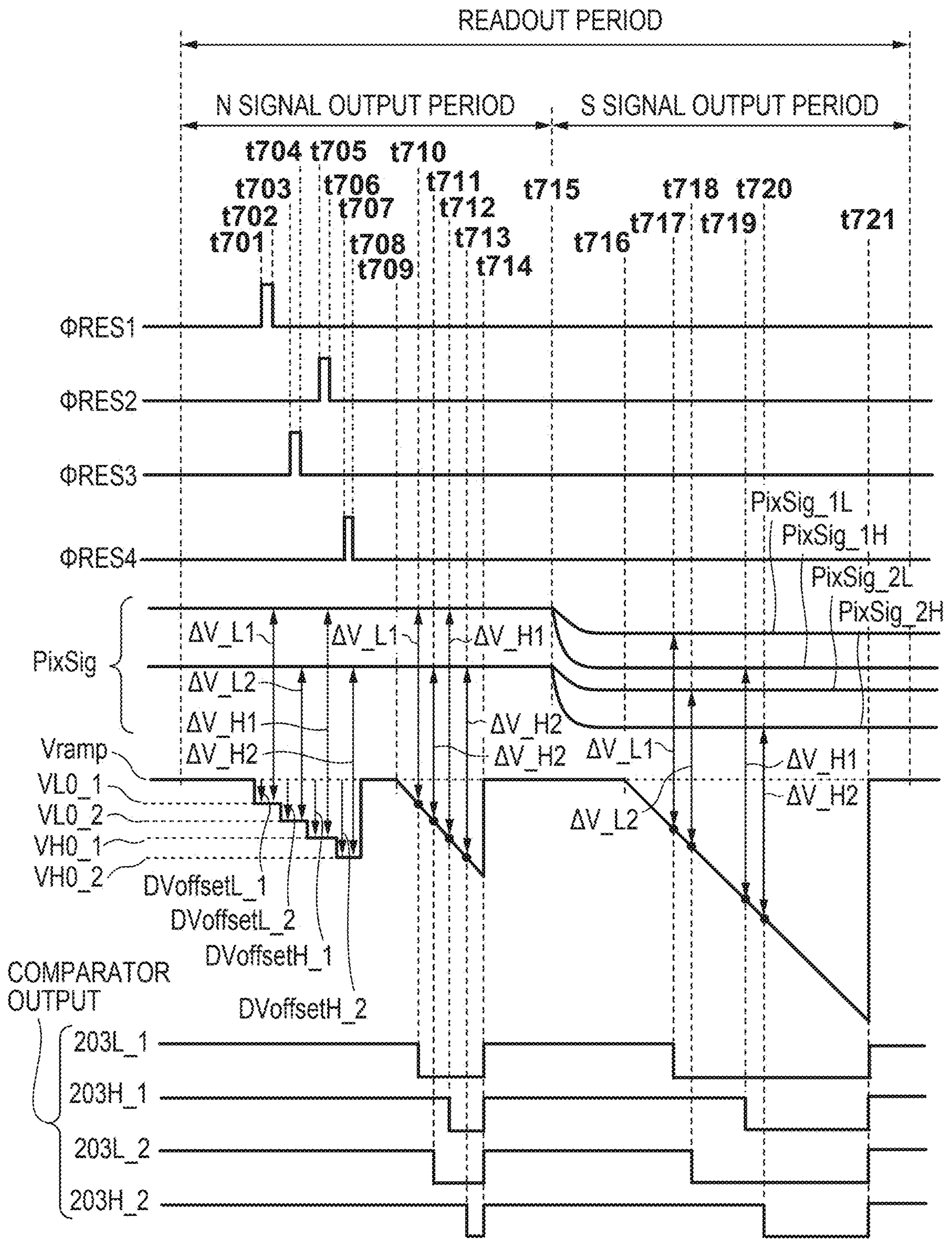
FIG. 7 is a timing chart of driving of the A/D converter according to the third embodiment.

FIG. 7 is a timing chart showing comparison driving of the comparator circuits 203 that constitute the comparator circuit unit 106, and outputs from the comparator circuits according to the embodiment. Vertical signal line potentials PixSig shown in FIG. 7 are the pixel signals of the vertical signal lines 102 that are output from the first and second unit pixels 101, and represent temporal changes of potentials multiplied by the gains of the column amplifiers 601 serving as the connection destinations of the respective vertical signal lines 102.

A voltage obtained by amplifying the pixel signal of the first unit pixel 101 with a low gain is represented as PixSigL_1, and a voltage obtained by amplifying the pixel signal with a high gain is represented as PixSigH_1. Similarly, a voltage obtained by amplifying the pixel signal of the second unit pixel 101 with a low gain is represented as PixSigL_2, and a voltage obtained by amplifying the pixel signal with a high gain is represented as PixSigH_2.

The comparison operation of the comparator circuit 203 according to the embodiment will be explained below with reference to the timing chart shown in FIG. 7. First, the reset operation of each comparator circuit 203 is performed.

First, the reference signal Vramp is changed from a voltage set at the start of a readout operation to a desired voltage VL0_1, and the comparator circuit 203L_1 is reset by the control signal ϕRES1 from time t701 to time t702. Then, the reference signal Vramp is changed to a voltage VL0_2, and the comparator circuit 203L_2 is reset by the control signal ϕRES3 from time t703 to time t704.

Subsequently, the reference signal Vramp is changed to a voltage VH0_1, and the comparator circuit 203H_1 is reset by the control signal ϕRES2 from time t705 to time t706. Finally, the reference signal Vramp is changed to a voltage VH0_2, and the comparator circuit 203H_2 is reset by the control signal ϕRES4 from time t707 to time t708.

Differences between the reference signal Vramp and the vertical signal line potentials PixSig at the time of cancellation of the reset of the comparator circuits 203 serve as the logical threshold voltages ΔV of the corresponding comparator circuits 203. In FIG. 7, ΔV_L1 represents the logical threshold voltage ΔV of the comparator circuit 203L_1, ΔV_L2 represents that of the comparator circuit 203L_2, ΔV_H1 represents that of the comparator circuit 203H_1, and ΔV_H2 represents that of the comparator circuit 203H_2.

The offset voltage ΔVoffset is defined, similar to the first and second embodiments. That is, an offset voltage determined at time t702 is defined as ΔVoffsetL_1, an offset voltage determined at time t704 is defined as ΔVoffsetL_2, an offset voltage determined at time t706 is defined as ΔVoffsetH_1, and an offset voltage determined at time t708 is defined as ΔVoffsetH_2.

A period from time t709 to time t714 is a comparison operation period for an N signal and the reference signal Vramp. An output from the comparator circuit 203L_1, an output from the comparator circuit 203L_2, an output from the comparator circuit 203H_1, and an output from the comparator circuit 203H_2 change respectively at time t710, time t711, time t712, and time t713 in accordance with the corresponding ΔV.

A period from time t716 to time t721 is a comparison operation period for an S signal and the reference signal Vramp. An output from the comparator circuit 203L_1, an output from the comparator circuit 203L_2, an output from the comparator circuit 203H_1, and an output from the comparator circuit 203H_2 change respectively at time t717, time t718, time t719, and time t720 in accordance with the magnitude relationships between the corresponding logical threshold voltage ΔV and the reference signal.

Subsequently, control of the output change timing of the comparator circuit 203 in the N signal comparison operation according to the embodiment will be explained. In the third embodiment, similar to the second embodiment, the output change timing of an N signal is made different between the comparator circuits 203 that output signals with the same gain.

At this time, in the N signal comparison operation, the comparator circuits 203 are driven so that the output change timings of the comparator circuits 203L_1 and 203L_2 become earlier than that of either of the comparator circuits 203H_1 and 203H_2.

More specifically, the reference signal Vramp in the embodiment is common, so the above-mentioned driving can be performed by setting ΔVoffsetL_1 and ΔVoffsetL_2 to be smaller than either of ΔVoffsetH_1 and ΔVoffsetH_2.

Since the same pixel signal is amplified with different gains, the time of the output change timing from the start of the comparison operation becomes shorter in the comparator circuit 203L than in the comparator circuit 203H for an S signal of the same pixel, similar to the second embodiment.

Accordingly, this driving can obtain effects similar to those of the second embodiment. That is, the third embodiment can be used to suppress a simultaneous change of outputs from the comparator circuits in the S signal comparison operation, and suppress, in the N signal comparison operation, a simultaneous change of outputs from many comparator circuits connected to pixels from which signals are simultaneously read out.

Note that when the difference between the first pixel signal and the second pixel signal is large, the comparator circuits 203 may simultaneously change in the S signal comparison operation even in this driving. More specifically, outputs from the comparator circuits may simultaneously change when the time difference between the output change timings of the comparator circuits 203 generated by the difference of a pixel signal is larger than the time difference between the output change timings generated by the offset voltage ΔVoffset and amplification of the column amplifier 601. Therefore, the offset voltage ΔVoffset desirably differs between pixels of the same color that are arranged near.

Application of Photoelectric Conversion Device to Equipment

Figure 8:
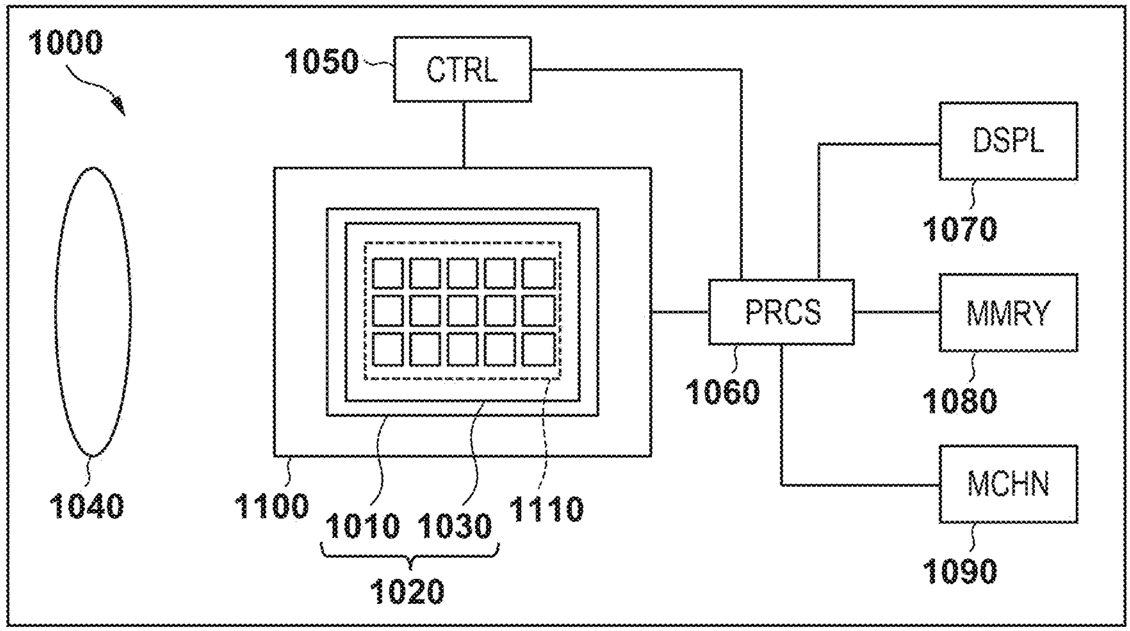
FIG. 8 is a view for explaining an application of the photoelectric conversion device to equipment according to an embodiment.

The following is a description of equipment 1000 that includes a semiconductor apparatus 1100 including a package 1020 on which a semiconductor chip 1110 including a semiconductor integrated circuit is mounted, as shown in FIG. 8. The semiconductor chip 1110 is accommodated in the package 1020 and mounted on the equipment 1000. In the arrangement shown in FIG. 8, the semiconductor chip 1110 includes the photoelectric conversion device according to the embodiment described above. The semiconductor apparatus 1100 can include the package 1020 including a base 1010 on which the semiconductor chip 1110 is fixed and a light transmissive member 1030 such as glass that faces the semiconductor chip 1110. The package 1020 can be provided with joining members such as wires and bumps that connect inner leads provided on the base 1010 to terminals such as pad electrodes provided on the semiconductor chip 1110.

The equipment 1000 can include at least one of an optical apparatus 1040, a control apparatus 1050, a processing apparatus 1060, a display apparatus 1070, a storage apparatus 1080, and a mechanical apparatus 1090. The optical apparatus 1040 is implemented by, for example, a lens, a shutter, and a mirror. The control apparatus 1050 controls the semiconductor chip 1110. The control apparatus 1050 is, for example, a semiconductor device such as an ASIC.

The processing apparatus 1060 processes a signal output from the photoelectric conversion device included in the semiconductor chip 1110. The processing apparatus 1060 is a semiconductor device such as a CPU or an ASIC for forming an Analog Front End (AFE) or a Digital Front End (DFE). For example, an image may be generated based on event signals E. The display apparatus 1070 is an Electronic Luminescence (EL) display device or a liquid crystal display device that displays an information image obtained by the semiconductor chip 1110. The storage apparatus 1080 is a magnetic device or a semiconductor device that stores the information image obtained by the semiconductor chip 1110. The storage apparatus 1080 is a volatile memory such as an SRAM or a DRAM, or a nonvolatile memory such as a flash memory or a hard disk drive.

The mechanical apparatus 1090 includes a moving or propulsion unit such as a motor or an engine. In the equipment 1000, the signal output from the semiconductor chip 1110 is displayed on the display apparatus 1070 or transmitted to an external apparatus by a communication apparatus (not shown) included in the equipment 1000. Hence, the equipment 1000 may further include the storage apparatus 1080 and the processing apparatus 1060 in addition to the memory circuits and arithmetic circuits included in the semiconductor chip 1110. The mechanical apparatus 1090 may be controlled based on the signal output from the semiconductor chip 1110.

In addition, the equipment 1000 is suitable for electronic equipment such as an information terminal (for example, a smartphone or a wearable device) which has a shooting function or a camera (for example, an interchangeable lens camera, a compact camera, a video camera, or a monitoring camera). The mechanical apparatus 1090 in the camera can drive the components of the optical apparatus 1040 in order to perform zooming, an in-focus operation, and a shutter operation. Alternatively, the mechanical apparatus 1090 in the camera can move the optical apparatus 1040 in order to perform an anti-vibration operation.

Furthermore, the equipment 1000 can be transportation equipment such as a vehicle, or a ship. The mechanical apparatus 1090 in the transportation equipment can be used as a moving apparatus. The equipment 1000 as the transportation equipment is suitable for an apparatus that transports the semiconductor chip 1110 or an apparatus that uses a shooting function to assist and/or automate drive steering. The processing apparatus 1060 for assisting and/or automating drive steering can perform, based on the information obtained by the semiconductor chip 1110, processing for operating the mechanical apparatus 1090 as a moving apparatus. Alternatively, the equipment 1000 may be medical equipment such as an endoscope, measurement equipment such as a distance measurement sensor, analysis equipment such as an electron microscope, office equipment such as a copy machine, or industrial equipment such as a robot.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-074040, filed Apr. 30, 2024, which is hereby incorporated by reference wherein in its entirety.

What is claimed is:

1. A photoelectric conversion device comprising:

a first pixel;

a first analog-to-digital converter configured to analog-to-digital-convert a signal from the first pixel;

a reference signal generation circuit configured to generate a first reference signal for which a voltage monotonously changes with respect to time at a first rate of change, and a second reference signal for which the voltage monotonously changes with respect to time at a second rate of change lower than the first rate of change; and a control circuit, wherein the first analog-to-digital converter includes a first comparator circuit configured to receive two signals including the signal from the first pixel and the first reference signal, and a second comparator circuit configured to receive two signals including the signal from the first pixel and the second reference signal, and prior to the analog-to-digital conversion, the control circuit applies a first offset voltage between the signals input to the first comparator circuit, applies a second offset voltage between the signals input to the second comparator circuit, and sets the first offset voltage and the second offset voltage to make a product of a reciprocal of the first rate of change and the first offset voltage be smaller than a product of a reciprocal of the second rate of change and the second offset voltage.

2. The device according to claim 1, wherein the applying the first offset voltage includes offsetting the first reference signal by the first offset voltage, and the applying the second offset voltage includes offsetting the second reference signal by the second offset voltage.

3. The device according to claim 1, wherein the applying the first offset voltage includes offsetting, by the first offset voltage, the signal from the first pixel that is input to the first comparator circuit, and the applying the second offset voltage includes offsetting, by the second offset voltage, the signal from the first pixel that is input to the second comparator circuit.

4. The device according to claim 1, wherein an absolute value of the first offset voltage is smaller than an absolute value of the second offset voltage.

5. The device according to claim 1, further comprising:

a second pixel different from the first pixel; and a second analog-to-digital converter configured to analog-to-digital-convert a signal from the second pixel, wherein the second analog-to-digital converter includes a third comparator circuit configured to receive two signals including the signal from the second pixel and the first reference signal, and a fourth comparator circuit configured to receive two signals including the signal from the second pixel and the second reference signal, prior to the analog-to-digital conversion, the control circuit applies a third offset voltage between the signals input to the third comparator circuit, and applies a fourth offset voltage between the signals input to the fourth comparator circuit, and each of the product of the reciprocal of the first rate of change and the first offset voltage, and a product of the reciprocal of the first rate of change and the third offset voltage is smaller than one of the product of the reciprocal of the second rate of change and the second offset voltage, and a product of the reciprocal of the second rate of change and the fourth offset voltage.

6. The device according to claim 5, wherein the applying the third offset voltage includes offsetting the first reference signal by the third offset voltage, and the applying the fourth offset voltage includes offsetting the second reference signal by the fourth offset voltage.

7. The device according to claim 5, wherein the applying the third offset voltage includes offsetting, by the third offset voltage, the signal from the second pixel that is input to the third comparator circuit, and the applying the fourth offset voltage includes offsetting, by the fourth offset voltage, the signal from the second pixel that is input to the fourth comparator circuit.

8. The device according to claim 5, wherein an absolute value of the third offset voltage is smaller than an absolute value of the fourth offset voltage.

9. A photoelectric conversion device comprising:

a first pixel;

a second pixel different from the first pixel;

a first analog-to-digital converter configured to analog-to-digital-convert a signal from the first pixel;

a second analog-to-digital converter configured to analog-to-digital-convert a signal from the second pixel;

a reference signal generation circuit configured to generate a reference signal for which a voltage monotonously changes with respect to time;

a control circuit; and a first amplifier circuit, a second amplifier circuit, a third amplifier circuit, and a fourth amplifier circuit, wherein the first amplifier circuit amplifies the signal from the first pixel with a first gain, the second amplifier circuit amplifies the signal from the first pixel with a second gain larger than the first gain, the third amplifier circuit amplifies the signal from the second pixel with the first gain, and the fourth amplifier circuit amplifies the signal from the second pixel with the second gain, the first analog-to-digital converter includes a first comparator circuit configured to receive two signals including an output signal of the first amplifier circuit and the reference signal, and a second comparator circuit configured to receive two signals including an output signal of the second amplifier circuit and the reference signal, and the second analog-to-digital converter includes a third comparator circuit configured to receive two signals including an output signal of the third amplifier circuit and the reference signal, and a fourth comparator circuit configured to receive two signals including an output signal from the fourth amplifier circuit and the reference signal, and prior to the analog-to-digital conversion, the control circuit applies a first offset voltage between the signals input to the first comparator circuit, applies a second offset voltage between the signals input to the second comparator circuit, applies a third offset voltage between the signals input to the third comparator circuit, applies a fourth offset voltage between the signals input to the fourth comparator circuit, and sets the first offset voltage, the third offset voltage, the second offset voltage, and the fourth offset voltage to make each of the first offset voltage and the third offset voltage be smaller than one of the second offset voltage and the fourth offset voltage.

10. A photoelectric conversion device comprising:

a first pixel;

a first analog-to-digital converter configured to analog-to-digital-convert a signal from the first pixel;

a reference signal generation circuit configured to generate a first reference signal for which a voltage monotonously changes with respect to time at a first rate of change, and a second reference signal for which the voltage monotonously changes with respect to time at a second rate of change lower than the first rate of change; and a control circuit, wherein the first analog-to-digital converter includes a first comparator circuit configured to receive two signals including the signal from the first pixel and the first reference signal, and a second comparator circuit configured to receive two signals including the signal from the first pixel and the second reference signal, and prior to the analog-to-digital conversion, the control circuit resets the first pixel, offsets by a first offset voltage the first reference signal input to the first comparator circuit, and offsets by a second offset voltage the second reference signal input to the second comparator circuit, in a period in which the analog-to-digital conversion is performed, the first comparator circuit compares a first logical threshold voltage corresponding to a difference between a voltage of a reset level of the first pixel and the first offset voltage with a difference between the signal from the first pixel and the first reference signal, the second comparator circuit compares a second logical threshold voltage corresponding to a difference between the voltage of the reset level of the first pixel and the second offset voltage with a difference between the signal from the first pixel and the second reference signal, and the first offset voltage and the second offset voltage are set to make a product of a reciprocal of the first rate of change and the first offset voltage be smaller than a product of a reciprocal of the second rate of change and the second offset voltage.

11. The device according to claim 10, wherein an absolute value of the first offset voltage is smaller than an absolute value of the second offset voltage.

12. The device according to claim 10, further comprising:

a second pixel different from the first pixel; and a second analog-to-digital converter configured to analog-to-digital-convert a signal from the second pixel, wherein the second analog-to-digital converter includes a third comparator circuit configured to receive two signals including the signal from the second pixel and the first reference signal, and a fourth comparator circuit configured to receive two signals including the signal from the second pixel and the second reference signal, and prior to the analog-to-digital conversion, the control circuit resets the second pixel, offsets by a third offset voltage the first reference signal input to the third comparator circuit, and offsets by a fourth offset voltage the second reference signal input to the fourth comparator circuit, in the period in which the analog-to-digital conversion is performed, the third comparator circuit compares a third logical threshold voltage corresponding to a difference between a voltage of a reset level of the second pixel and the first offset voltage with a difference between the signal from the second pixel and the first reference signal, the fourth comparator circuit compares a fourth logical threshold voltage corresponding to a difference between the voltage of the reset level of the second pixel and the fourth offset voltage with a difference between the signal from the second pixel and the second reference signal, and each of the product of the reciprocal of the first rate of change and the first offset voltage, and a product of the reciprocal of the first rate of change and the third offset voltage is smaller than one of the product of the reciprocal of the second rate of change and the second offset voltage, and a product of the reciprocal of the second rate of change and the fourth offset voltage.

13. The device according to claim 12, wherein an absolute value of the first offset voltage and an absolute value of the third offset voltage are smaller than one of an absolute value of the second offset voltage and an absolute value of the fourth offset voltage.

14. Equipment comprising:

a photoelectric conversion device defined in claim 1; and a processing apparatus configured to process an output signal from the photoelectric conversion device.

* * * * *